Dec. 15, 1936. C. A. GOLDSMITH 2,064,742
GREASING DEVICE
Filed Feb. 13, 1936 2 Sheets-Sheet 1
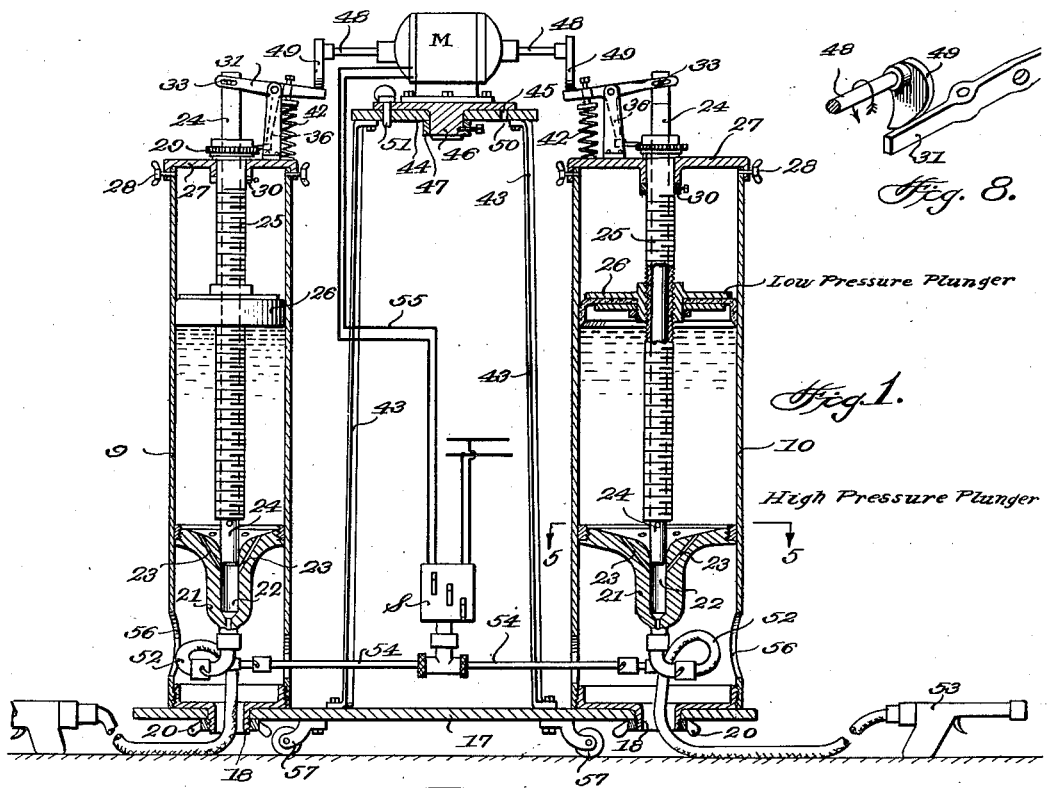
Inventor
Charles A. Goldsmith Dec. 15, 1936. C. A. GOLDSMITH 2,064,742
GREASING DEVICE
Filed Feb. 13, 1936 2 Sheets-Sheet 2

Inventor
Charles A. Goldsmith

By Munn, Anderson & Liddy
Attorney

Patented Dec. 15, 1936

2,064,742

UNITED STATES PATENT OFFICE 2,064,742

GREASING DEVICE

Charles Arthur Goldsmith, Sunbury, Pa.

Application February 13, 1936, Serial No. 63,798

6 Claims. (Cl. 221—47.1)

My invention relates to improvements in greasing devices and more particularly in devices for greasing automobiles and the like and it consists in the combinations, constructions and arrangements herein described and claimed.

An object of my invention is to provide a more efficient way of greasing cars than the usual means.

A further object is to provide a device which will dispense the grease from tubes or containers which may readily be placed in position thereby obviating the necessity of transferring the grease from one receptacle to another.

A further object is to provide a greasing device that can be manufactured cheaper than the ordinary greasing device.

A further object of the invention is to provide a power operated greasing device which will permit one man or two men to operate at the same time, one using one kind of grease and the other another kind, or both men using the same kind.

Other objects and advantages will appear in the following specification and the novel features of the invention will be particularly pointed out in the appended claims.

My invention is illustrated in the accompanying drawings forming part of this application, in which:

Figure 1 is a vertical sectional view along the line 1—1 of Figure 2,

Figure 2 is a plan view of the device,

Figure 8 is a perspective view of the cam and lever.

This device may be used for oil or even paints or other liquids in machine shops, factories, etc.

In carrying out my invention I provide tubes or cylinders which serve as containers for the grease. In Figures 1 and 2 I have shown two of the cylinders at 9 and 10 respectively. It will be observed that, in the instance given, the tubes or cylinders are of different size and a grease of a different kind or consistency may be carried in one cylinder from that contained in the other. Other cylinders such as those shown at 11, 12, 13, 14, 15 and 16 are disposed concentrically on a base 17. The means for securing each tube or cylinder is the same and a description of one will suffice for all.

Figure 5:
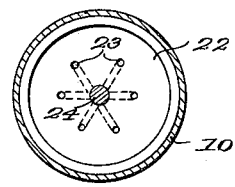
Figure 5 is a section along line 5—5 of Figure 1.
Figure 7:
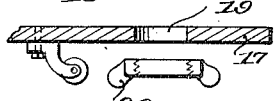
Figure 7 is a section through a base plate and clamping nut taken on a radial vertical plane through the center of a grease tube.

Consider the cylinder 10; it is provided with a threaded neck 18 which screws into an opening 19 in the base plate 17 and is held by a winged nut 20, (see Fig. 7) so as to maintain the tube in an upright position. Within the cylinder 10 is a member 21 having a body portion provided with a vertically extending bore 22, the upper end of the body portion being flared out as shown at 22 and being secured to the side walls of the cylinder openings 23, (see Fig. 5) extend from the flared portion downwardly and inwardly and communicate with the bore 22.

A plunger 24 is provided, the lower end of which may enter the bore 22, the upper end of the plunger extending outside of the tube or container. The plunger is surrounded by a threaded sleeve 25 which passes through a plunger or piston 26.

Figure 3:
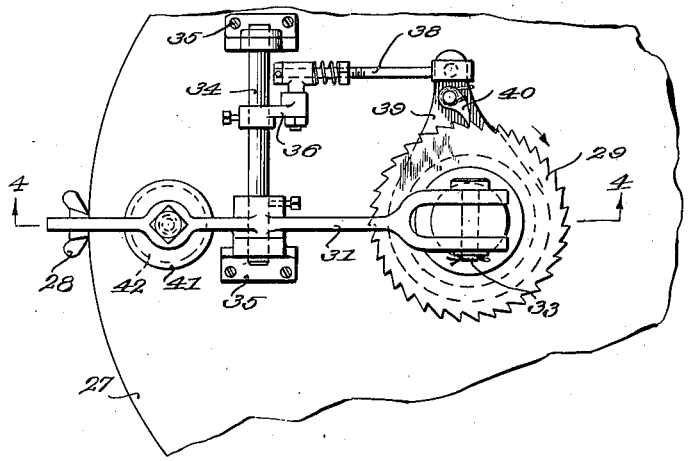
Figure 3 is an enlarged detail plan view of a portion of the device.
Figure 4:
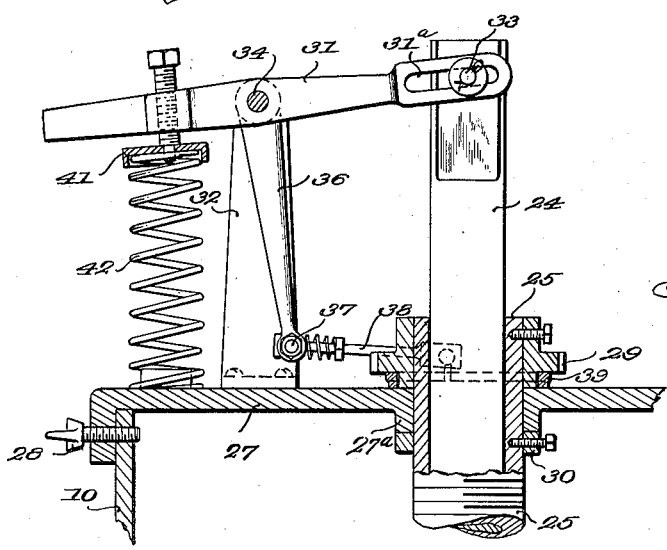
Figure 4 is a section along the line 4—4 of Figure 3.

At the top of the tube is a cap 27 which is secured in position by thumb screws 28 as shown in Fig. 4. Above the cap is mounted a ratchet-wheel 29 which is secured to the sleeve 25. The cap 27 has a boss 27a having an opening through which the sleeve freely rotates. A collar 30 is secured to the sleeve below the boss to prevent longitudinal play of the sleeve.

The upper end of the plunger stem 24 is pivotally attached to a lever 31 which is mounted on a bracket 32. The lever is slotted as shown at 31a and a pivot pin 33 passes through the slot.

The lever 31 is secured to a rock shaft 34 mounted in bearings 35. This rock shaft bears an arm 36 which is pivotally connected at 37 with a spring pressed link 38, attached to an arm 39 which is pivotally mounted to oscillate about the center of the ratchet-wheel 29. A pawl 40 engages the ratchet-wheel in its movement in one direction but rides over it in its movement in the other direction.

The opposite end of the lever 31 has an adjustable plate 41 which bears on a spring 42 that rests on the plate 27.

Mounted on the base 17 is a stand 43 having a top 44 for rotatably supporting a plate 45. The latter is provided with a stub shaft 46 which passes through a central opening in the top 44. A collar 47 is secured to the end of the stub shaft to prevent dislodgment of the plate. A motor M is provided, the shaft 48 being prolonged at both ends, as shown in the drawings. Each end of this shaft 48 bears a cam 49 which is arranged to engage one end of the lever 31 (see Fig. 8). The plate 45 is provided with openings 50 and a pin 51 is arranged to extend through any one of these openings and a registering opening in the top 44 so as to lock the rotatable plate 45 in any of a number of predetermined positions.

Normally the grease container or tube would come to the service station filled with grease and to that end the cap 27, plunger 24, sleeve 25, piston 26, lever 31, ratchet 29 and its connections, would be removed from the tube and a plain cap would be substituted in place of the cap 27. When it is desired to use the tube the plain cap is removed and the cap 27, with the operating mechanism carried thereby, would be substituted.

Figure 6:
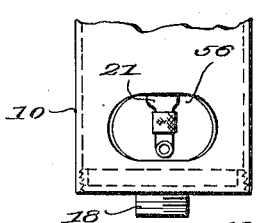
Figure 6 is a side view of a portion of a grease tube or cylinder.

In setting up the apparatus, a flexible tube 52 is attached by a quick connection to the discharge end of the member 21 (see Fig. 1) and brought out through the neck 18 or at any other suitable point and a grease gun 53 is attached to this flexible connection. There is also a pipe 54 which communicates with a pressure switch S, shown diagrammatically in Fig. 1, the latter being connected by conductors 55 with the motor M. In order to facilitate the attachment of the flexible tube the cylinders are provided with hand holes 56, such as that shown in Fig. 6.

From the foregoing description of the various parts of the device the operation thereof may be readily understood. The cylinders are all mounted as described in connection with the cylinder 10 upon a base 17 with their centers concentric with the center of the plate 45 which bears the motor M. The motor M is also centered on the circular plate 45. Let us assume that it is desirable to grease a car, one man working with one kind of grease and another with another kind of grease, or greases of different consistency. The pin 51 is withdrawn and the plate 45 bearing the motor M is swung so that the ends of the shaft 48, bearing the cams 49, are over the levers on opposite sides of the motor M which are associated with those two tubes from which grease is to be dispensed. In Fig. 2 the motor is shown as in operative relation with the cylinders 9 and 10. At the beginning of the operation the pistons or plungers 26 are at the top of the cylinders. The switch is thrown to actuate the motor and the revolution of the latter tends to bring the cams 49 into intermittent engagement with the ends of the levers 31, thus pressing the inner ends of the levers 31 downwardly against the tension of the spring 42. At the same time the rock shaft 34 oscillates the pawl 40 so as to cause a step by step movement of the ratchet wheel 29 and hence the rotation of the threaded sleeve 25. This causes the downward travel of the plunger 26 and it tends to force the grease through the passages 23 into the bore 22. When the cam moves to a position away from the end of the lever, the spring 42 forces the plunger 24 downwardly, thus forcing the grease which has been fed into the bore 22 into the flexible tube and out toward the grease gun. When the pressure exceeds a predetermined amount, the pressure switch S acts to stop the motor, but on the release of pressure by the use of the grease gun the motor again comes into operation and the grease is forced out.

If it is desired to operate the low pressure piston 26 only, then all that is necessary is to remove the pin 33, thus stopping the movement of the plunger 24. The grease will be fed then through the passages 23.

When it is desired to use another pair of cylinders the motor can be swung into position and locked as in the manner described. The device is mounted on casters 57 which renders it portable, it being understood that a suitable flexible connection can be used for connection to the source of current.

I claim:

1. The combination of a plurality of grease containers, said grease containers being disposed on a circle about a common center, a motor disposed at the common center and having the ends of its shaft prolonged, means associated with each container for dispensing grease and means carried by the ends of the motor shaft for actuating the grease dispensing means of any of said containers.

2. In a greasing device, a motor mounted for rotation about its central vertical axis, a plurality of grease containers disposed concentrically around said motor, grease dispensing means carried by each container, means carried by the motor for actuating the grease dispensing means of any of said containers and means for locking said motor in operative relation with the grease dispensing means of any desired container.

3. In a greasing device, a motor mounted for rotation about a central vertical axis, a plurality of grease containers disposed concentrically around said motor, a lever associated with each grease container, means actuated by the lever of each container for dispensing grease, and eccentrics carried by the motor shaft and arranged to engage any of said levers for actuating the grease dispensing mechanism of any predetermined container.

4. In a greasing device, a plurality of grease containers, a rotatable threaded sleeve disposed in each container, a movable plunger mounted on said threaded sleeve, a slidable plunger disposed in said threaded sleeve and means carried by each container for simultaneously rotating said sleeve and for reciprocating said slidable plunger.

5. In a greasing device, a plurality of grease containers, a rotatable threaded sleeve disposed in each container, a movable plunger mounted on said threaded sleeve, a slidable plunger disposed in said threaded sleeve, means carried by each container for simultaneously rotating said sleeve and for reciprocating said slidable plunger, the last named means comprising a lever having a slotted end, a pin carried by the plunger and extending into the slot, a ratchet wheel carried by the threaded sleeve and a pawl carried by the lever for actuating the ratchet wheel.

6. In a greasing device, a plurality of grease containers, a rotatable threaded sleeve disposed in each container, a movable plunger mounted on said threaded sleeve, a slidable plunger disposed in said threaded sleeve, means carried by each container for simultaneously rotating said sleeve and for reciprocating said slidable plunger, the last named means comprising a lever having a slotted end, a pin carried by the plunger and extending into the slot, a ratchet wheel carried by the threaded sleeve, a pawl carried by the lever for actuating the ratchet wheel, a constricted discharge passage for receiving the grease and a flexible connection at the end of said discharge passage.

CHARLES A. GOLDSMITH.